Aug. 11, 1953  H. T. LANIGAN  2,648,136
PISTON RING FITTING DEVICE
Filed Nov. 29, 1950
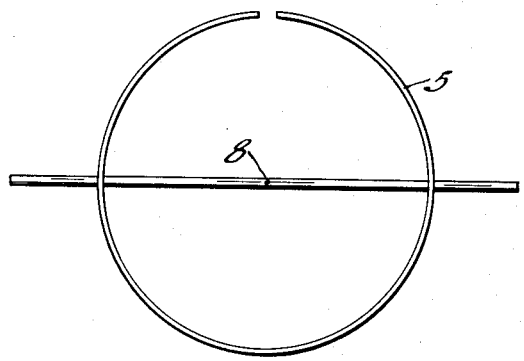
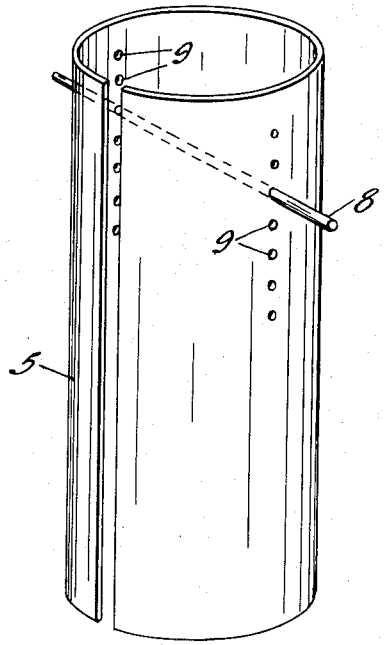
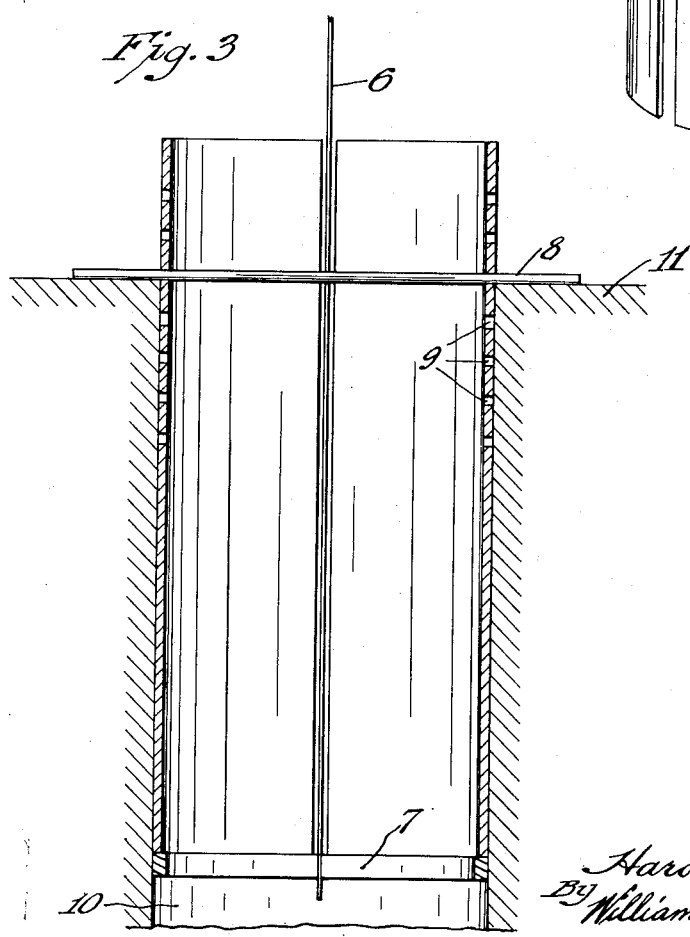
Inventor
Harold T. Lanigan
By Williamson & Williamson
Attorneys Patented Aug. 11, 1953

2,648,136

UNITED STATES PATENT OFFICE 2,648,136

PISTON RING FITTING DEVICE

Harold T. Lanigan, Minneapolis, Minn.

Application November 29, 1950, Serial No. 198,217

1 Claim. (Cl. 33—181)

This invention relates to a device for assisting in the fitting of piston rings for internal combustion engines.

As long as internal combustion engines have been in use, it has been a difficult problem for mechanics to fit piston rings into the engine cylinders. This is particularly true when an engine is being repaired after considerable use, and the cylinder walls are somewhat tapered. It is absolutely necessary that the ring being fitted be positively positioned in the precise location within the cylinder in which it is to be located at the bottom of the piston stroke.

It is an object of my invention to provide an extremely novel, and yet highly efficient device for positively positioning a piston ring within a cylinder at the precise desired position therein, while permitting the spacing between the ring ends to be accurately gauged when in said position.

More specifically it is an object to provide a split sleeve adapted to be inserted into a cylinder to push a piston ring down into the cylinder, and having stop means for positively limiting the downward shifting movement of the sleeve and ring within the cylinder.

It is still another object to provide a piston ring positioning device having an adjustment for properly positioning a selected ring to permit all of the rings of a piston to be selectively positioned with the same positioning device.

These and other objects and advantages will more fully appear from the following description made in connection with the accompanying drawings wherein like reference characters refer to the same or similar parts throughout the several views, and in which:

Fig. 1 is a top plan view of my ring positioner.

Fig. 2 is a perspective view thereof; and

Fig. 3 is a vertical sectional view showing my ring positioner in operative position within a cylinder wall.

As shown in the accompanying drawings, I provide a ring positioning device in the form of an annular cylindrical sleeve member 5 longitudinally split down one side thereof to permit the diameter to be slightly varied to facilitate insertion into a cylinder, and to permit a feeler gauge, such as the gauge 6 shown in Fig. 3, to be inserted between the ends of a piston ring, such as the ring 7 positioned within the cylinder by said sleeve 5.

Suitable stop means, such as the transversely disposed rod 8 inserted through horizontally opposed apertures 9 formed through the upper portion of the side walls of said sleeve, are provided. A number of vertically spaced holes 9 are formed in each side wall of the upper portion of sleeve 5 to permit a stop rod 8 to be adjusted vertically to limit the downward movement of the sleeve 5 within the cylinder 10 shown in Fig. 3. The upper extremity of the cylinder block 11 surrounding said cylinder 10 engages the cross rod 8 and positively positions the sleeve within the cylinder.

It should be noted that most cylinders taper slightly toward the bottom thereof, and that the piston ring fitted therein must have the ends thereof spaced apart a prescribed predetermined distance when said rings are positioned at the bottom of the piston stroke within the cylinder, or in other words, when they are positioned within the smallest part of the cylinder. This clearance is, of course, to permit expansion of the ring when heated. If this clearance is too great the ring of course will not be tight enough to seal the oil from flowing into the upper portion of the cylinder, and if the clearance is not great enough, the pressure, when the rings expand due to the heat from the engine, will often cause breakage of the ring, and serious damage to the cylinder wall. By leaving the sleeve within the cylinder, while the feeler gauge 6 is inserted between the ends of the ring 7, the danger of the ring 7 shifting during the gauging operation, is eliminated, and thus the ring can be maintained in the desired precise predetermined position within the cylinder wall at all times. The oil ring, of course, is the lowermost ring, and the three compression rings may be similarly set by raising the lower terminal position of the positioning sleeve by lowering the rod 8 in the sleeve.

The clearance between the ends of the ring, is of course varied by filing off the ends until the desired clearance is obtained. Of course, a number of sizes of sleeve 5 may be manufactured to fit the different sized cylinders of the various engines.

It will be seen that I have provided an extremely simple and ingenious, highly efficient ring positioner for use in fitting piston rings within an engine cylinder.

It will of course be understood that various changes may be made in the form, details, arrangements, and proportions of the parts without departing from the scope of my invention.

What I claim is:

A ring positioning tool comprising an elongated split annular sleeve member, the upper portion of said sleeve having a number of vertically spaced horizontally opposed apertures formed therein, a stop rod selectively inserted through horizontally opposed apertures for engagement against the block adjacent the engine cylinder to limit the downward movement of said sleeve within the cylinder.

HAROLD T. LANIGAN.

References Cited in the file of this patent

UNITED STATES PATENTS

| Number | Name | Date |
|---|---|---|
| 953,282 | Nash | Mar. 29, 1910 |
| 1,227,105 | Barnes | May 2, 1917 |
| 1,385,477 | Semones | July 26, 1921 |
| 1,393,261 | Casey | Oct. 11, 1921 |
| 2,200,181 | Lamond | May 7, 1940 |
| 2,454,159 | Graves | Nov. 16, 1948 |
| 2,529,292 | Greenfield | Nov. 7, 1950 |

FOREIGN PATENTS

| Number | Country | Date |
|---|---|---|
| 170,370 | Switzerland | Oct. 9, 1933 |